INVENTORS:
FRITZ LUDWIG FELIX STEGHART
PETER LESLIE KERSHAW
TREVOR EXELBY OLIVER
LEONARD GEORGE FARRANT
by E. M. Squire
THEIR ATTY United States Patent Office 3,424,377
Patented Jan. 28, 1969

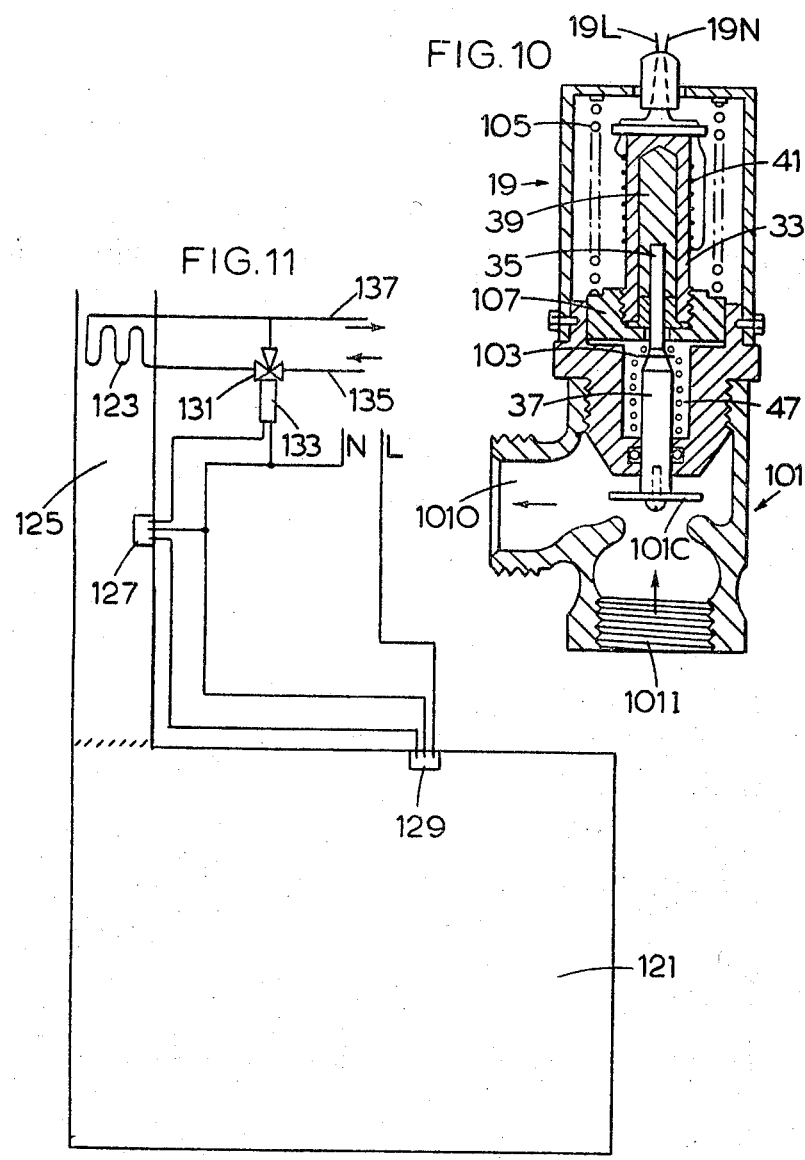

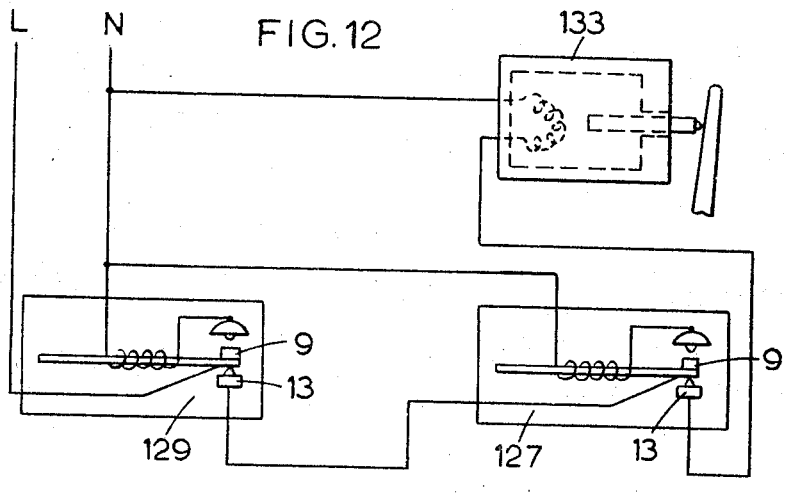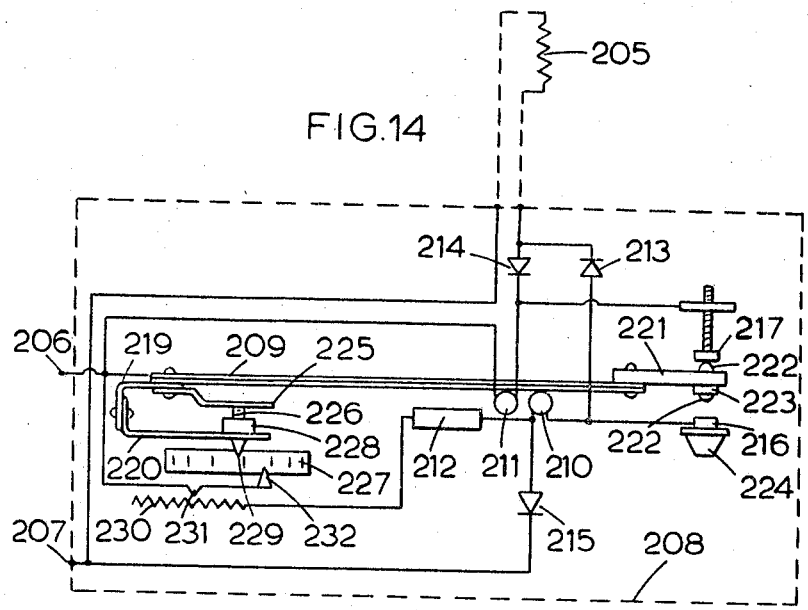

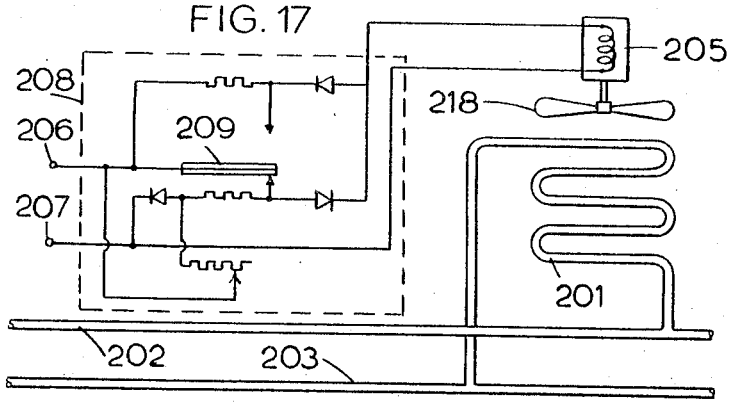
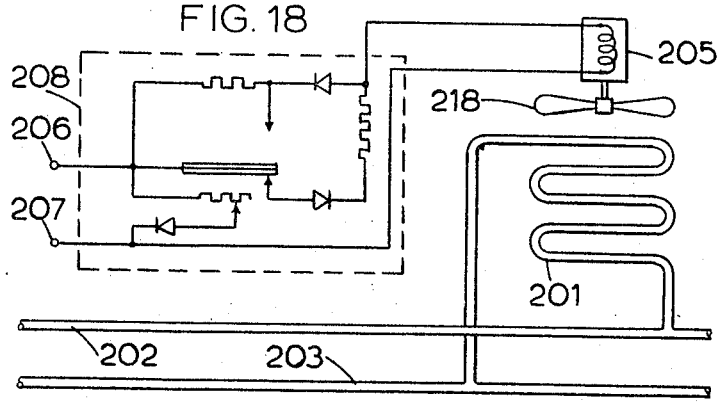
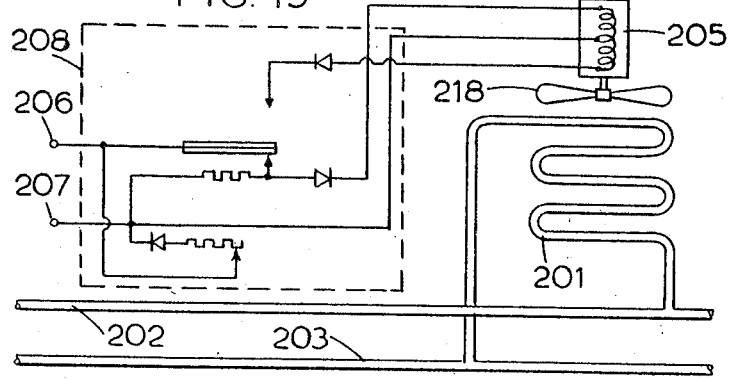

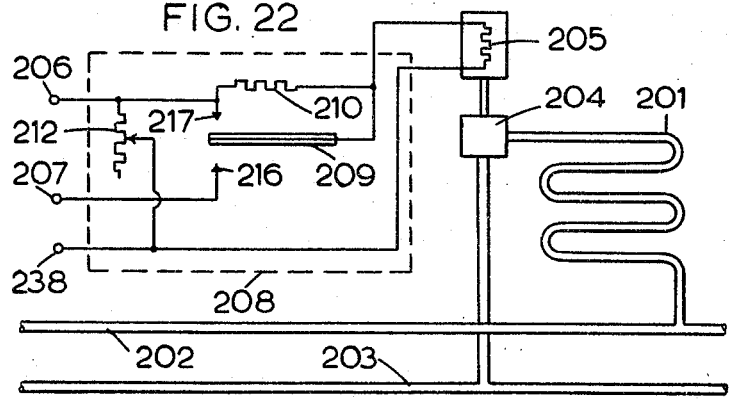
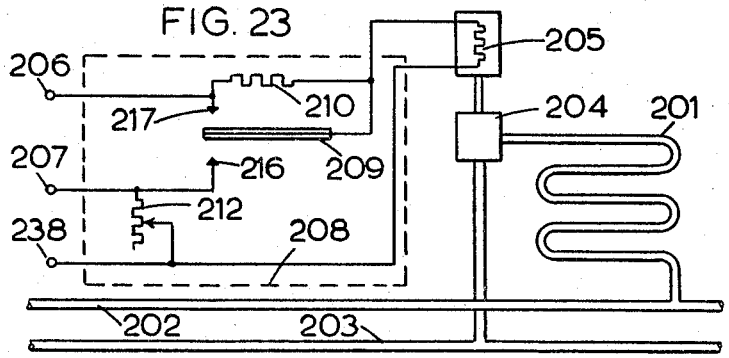
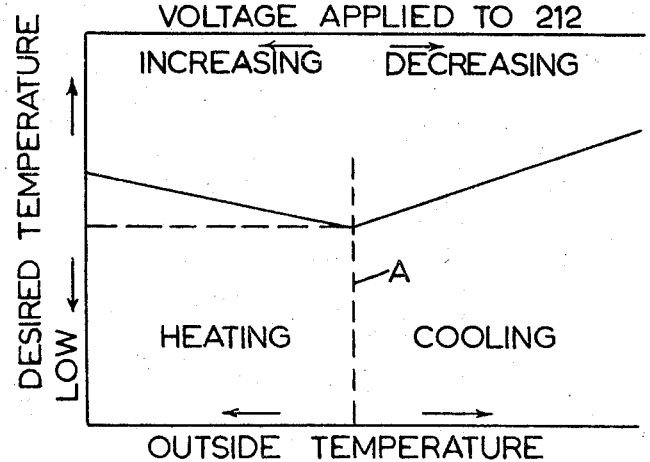

3,424,377
APPARATUS FOR CONTROLLING THE TEMPERATURE OF A MEDIUM
Fritz Ludwig Felix Steghart, Gerard Cross, Peter Leslie Kershaw, Slough, and Trevor Exelby Oliver, Windsor, England, and Leonard George Farrant, Vancouver, British Columbia, Canada, assignors to Satchwell Controls Limited, Slough, Buckinghamshire, England, a company of the United Kingdom
Filed Oct. 11, 1965, Ser. No. 562,981
Claims priority, application Great Britain, Oct. 12, 1964, 41,495; Dec. 3, 1964, 49,246; Dec. 9, 1964, 50,152; Apr. 12, 1965, 14,171
U.S. Cl. 236—1                9 Claims
Int. Cl. G05d 23/00, 15/00

ABSTRACT OF THE DISCLOSURE

An automatic temperature control system which includes a thermostatic device yet ensures a substantially uniform output of heat from, or absorption of heat by a heating and/or cooling device controlled by the thermostatic device. The thermostatic device is adapted to operate at a predetermined temperature and is subjected to the temperature which is to be controlled. A heat exchanger is arranged to effect a desired heat transfer between a first medium and a second medium of which the temperature of the second medium affects the controlled temperature. An electric motor changes the rate of heat transfer. A circuit means is provided by which the operation of the thermostatic device modifies the degree of energization of the motor means to correct the temperature variation which caused operation of the thermostatic device. Means are also provided and arranged to superimpose on the control of the motor means by the thermostatic device a time-modulated oscillatory effect.

---

This invention relates to improvements in automatic temperature control systems.

Existing temperature control systems utilise a thermostat and a heating device the operation of which is controlled by the thermostat. Since the operation of a thermostat is essentially an alternation of "on" and "off" states, the heating device also is switched alternately on and off, resulting in large swings in the temperature of the heating device and as a result, large swings in the temperature of a space, such as a room, heated by that heating device.

An object of the present invention is the provision of an improved automatic temperature control system including a thermostat device and yet ensuring a substantially uniform output of heat from, or absorption of heat by, a heating and/or cooling device controlled by the thermostat device.

According to the present invention an automatic temperature control system comprises a thermostatic device adapted to operate at a predetermined temperature and subjected to the temperature which is to be controlled, a heat exchanger arranged to effect a desired heat transfer between a first medium and a second medium of which the temperature of the second medium affects the controlled temperature, electric motor means arranged when energised to change the rate of heat transfer, circuit means by which operation of the thermostatic device modifies the degree of energisation of the motor means in a manner tending to correct the temperature variation which caused operation of the thermostatic device, and further means arranged to superimpose on the control of the motor means by the thermostatic device a time-modulated oscillatory effect.

A further object of the invention is the provision of an improved temperature control system suitable for use in an installation required to produce at different times heating and cooling.

An orthodox temperature control system, such as is used in the control of the space heating of a building, employs a thermostat which is disposed at a suitable location in the space to be heated. This thermostat controls the setting of a valve which has two stable positions, namely fully open and fully closed, and the thermostat is set to a nominal value but has a dead space or differential at the set value so that the valve will be opened in a positive manner as the temperature falls past a first value somewhat less than the set value and will be closed in a positive manner as the temperature rises past a second value somewhat higher than the set value. The difference between the first and second values is the differential of the thermostat, and it is necessary in order that the operation of the valve shall be positive and free from flutter. Because of this differential, and because the heating provided by the valve when it is fully open must exceed the average heating required to keep the space at the desired temperature, in normal use the valve alternately opens and closes in a cyclic manner with a cyclic period which may be quite long when the thermal capacity of the space is large.

According to one aspect of the present invention, a temperature controlling system adapted to regulate the rate of heat transfer between a first medium and a second medium which second medium affects the temperature which is to be controlled at or near a set temperature, includes heat transfer controlling means providing a continuously variable control of the rate of heat transfer, between an upper limit and a lower limit, between the two mediums, a thermostatic device exposed to the controlled temperature and arranged when the controlled temperature falls past the set temperature to initiate through the controlling means a change in the rate of heat transfer towards an appropriate first of the two limits and when the controlled temperature rises past the set temperature to initiate through the controlling means a change in the rate of heat transfer towards the second of the two limits, the thermostatic device being included in a circuit energised by an electrical supply the polarity of which indicates whether the second medium is to be cooled or whether it is to be heated, the circuit being such that the controlling means are energised during cooling in a manner different from the manner in which they are energised during heating of the second medium.

The invention will now be described, by way of example, with reference to the accompanying drawings, in which:

FIGURE 10 is a sectional side elevation of a combined thermal motor and valve which is an alternative to the arrangement shown in FIGURE 4;

FIGURE 11 is a diagrammatic representation of a ducted air space heating system;

FIGURE 12 is a circuit diagram of two thermostats shown in FIGURE 11;

FIGURE 14 is a schematic representation of a thermostat shown in FIGURE 1;

FIGURE 17 illustrates an alternative embodiment of the device of FIGURE 13;

FIGURE 18 illustrates an alternative embodiment of the device of FIGURE 15;

FIGURE 19 illustrates an alternative embodiment of the device of FIGURE 16;

FIGURE 22 illustrates an alternative embodiment of the device of FIGURE 13;

FIGURE 23 illustrates an alternative embodiment of the device of FIGURE 22;

FIGURE 24 is a graphical illustration of a desired operating characteristic given by the embodiments of FIGURES 25 and 26;

Figure 1:
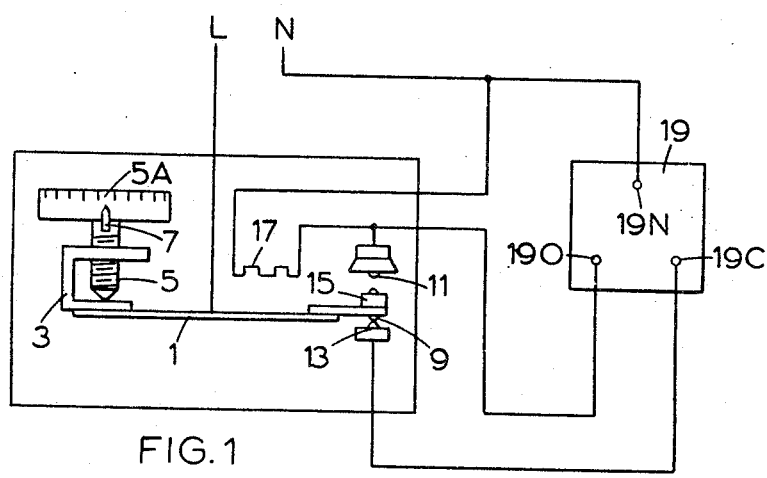
FIGURE 1 is a diagrammatic representation of a thermostat arranged to control a valve actuating motor of a heating and/or cooling device.

Referring first to FIGURE 1, in this orthodox arrangement a bimetallic strip 1 is mounted at one end on a member 3 which can be rocked by an adjusting screw 5 which has an enlarged head 5A with peripheral graduations which in conjunction with a pointer 7 enable the bimetallic strip 1 to be initially positioned in accordance with a desired set temperature. The free end of the bimetallic strip 1 is provided with two oppositely facing contacts 9 and this end of the strip can move so that contacts 9 can engage either an upper contact 11 or a lower contact 13. When the controlled temperature to which the bimetallic strip 1 is exposed is less than the set temperature, the contacts 9 and 11 make, and when the controlled temperature is greater than the set temperature, the contacts 9 and 13 make. The strip 1 also carries a small magnet 15 which cooperates with magnetic members adjacent contacts 11 and 13, so that there is a snap action in the movement of contacts 9 between contacts 11 and 13.

The bimetallic strip 1 is connected to the live terminal L of an electrical supply, the neutral terminal N of which is connected firstly through a heater element 17 positioned adjacent the bimetallic strip 1 to the upper contact 11 and secondly to the neutral terminal 19N of a reversible electric motor 19. Motor 19 is arranged to drive a valve (not shown) between an "open" position and a "closed" position, and has two input terminals 19O and 19C. If terminal 19O is connected to the L terminal of the supply, the motor will drive the associated valve towards its open position, and if the terminal 19C is connected to the L terminal of the supply, then the motor will drive the associated valve towards its closed position. Terminal 19O is connected to the upper contact 11, and terminal 19C is connected to the lower contact 13.

If the temperature of the air to which the strip 1 is exposed falls below the set temperature, the bimetallic strip will be in an upper limiting position, in which contacts 9 and 11 make. The motor 19 will be caused to run in the "valve opening" direction by current flowing from the supply terminal L through the bimetallic strip 1, the contacts 9 and 11, the motor terminal 19O, the motor, the motor terminal 19N to the supply terminal N. At the same time, current will flow from supply terminal L through the bimetallic strip 1, the contacts 9 and 11, and the heater element 17 to the supply terminal N. The heater element will supply heat to and thus raise the temperature of the bimetallic strip somewhat, for example by one degree F. If the controlled temperature is much below the set temperature, this will have no effect, but if the controlled temperature is close to the set temperature, the increase in temperature by the action of the heater element will be sufficient to cause the bimetallic strip to straighten so that contacts 9 and 11 break and contacts 9 and 13 make. This will deenergise the heater element 17, and at the same time will cause a current to flow through the bimetallic strip 1, the contacts 9 and 13, the motor terminal 19C, the motor, and the motor terminal 19N to the supply terminal N, which current will cause the motor to run in the "valve closing" direction.

The valve referred to above controls the flow of heated water to a heat exchanger (not sohwn) and thus the setting of the valve controls the temperature of the water in that heat exchanger. When the valve is open, the temperature of the water rises, and the heat output of the heat exchanger, to the space the temperature of which is controlled by the thermostat rises, while if the valve is closed, the heat output falls.

Figure 2:
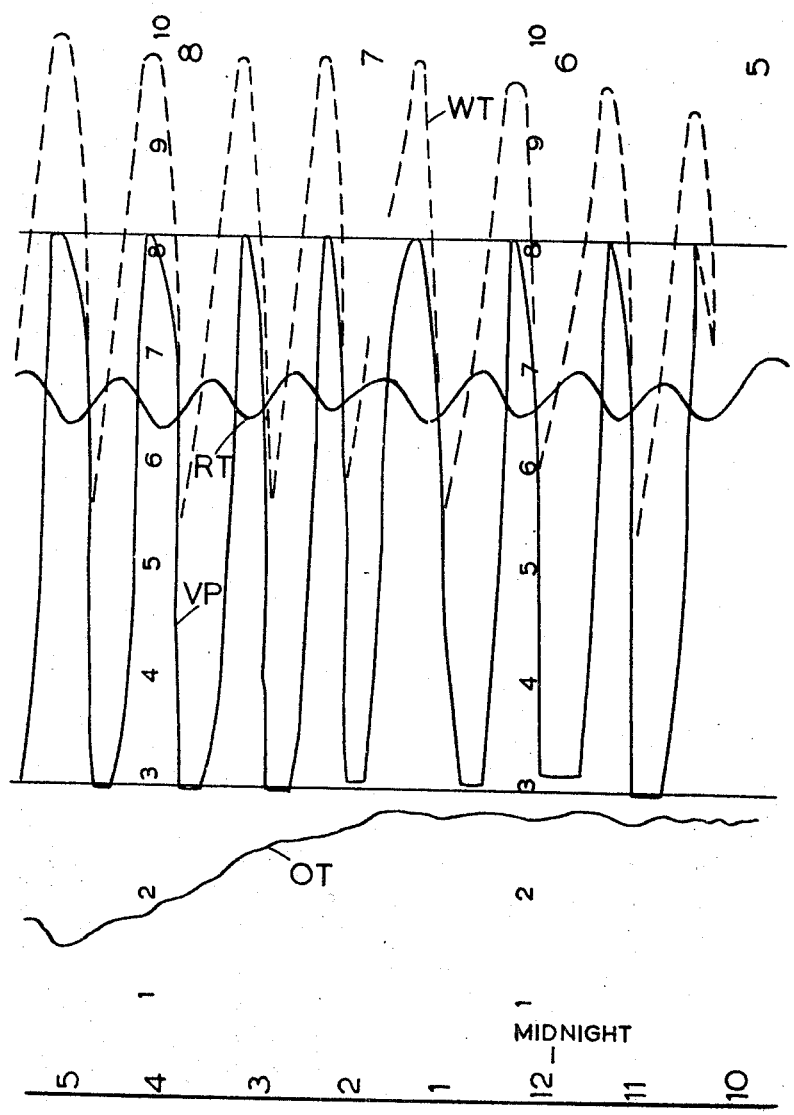
FIGURE 2 is a graphical representation of the operating characteristics of the heating and/or cooling device of FIGURE 1.

FIGURE 2 shows how in a practical installation the room temperature (trace RT), the outside temperature (trace OT), the valve position, i.e., open or closed (trace VP) and the controlled water temperature (trace WT) vary with time during use. It will be seen that the valve (trace VP) goes from its open to its closed positions, or vice versa, each time the thermostat operates, and this results in a repeated alternation of the water temperature (trace WT) between higher and lower values which are between 50 and 60° F. apart. The room temperature (trace RT) oscillates between upper and lower temperatures which are about 1° F. apart.

Figure 3:
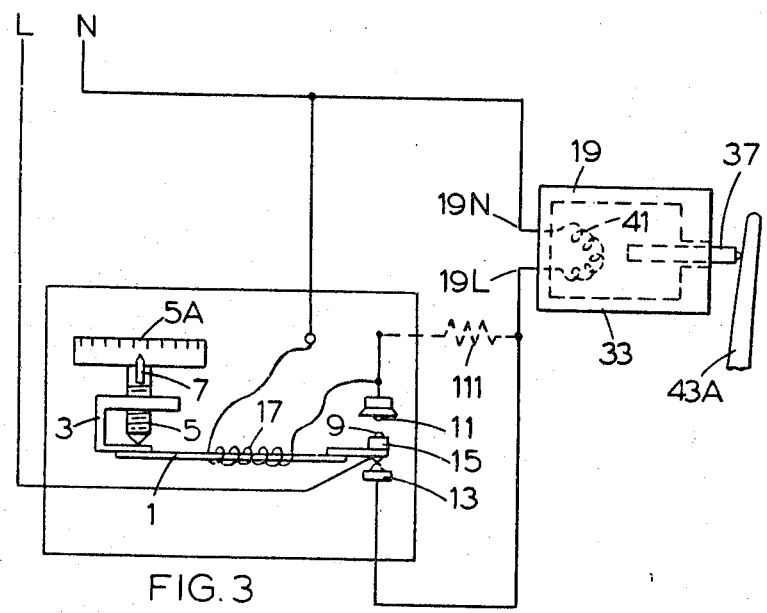
FIGURE 3 is a diagrammatic representation of an arrangement, according to the present invention, of a thermostat device and a thermal motor controlled by that device and actuating a valve of a heating and/or cooling device.

Referring now to FIGURE 3, this illustrates an automatic temperature control system according to the present invention. The system includes a thermostat device which is generally similar to that shown in FIGURE 1, and the numerals used in FIGURE 1 have been used to denote corresponding parts. However, in order to produce the different operating characteristics required, several departures from orthodox design have been made. Thus the bimetallic strip 1 is reduced in thickness compared with existing designs to increase its sensitivity, and it is 0.025 of an inch thick, 0.5 of an inch wide and 2 inches long. The heater element 17 consists of 365 turns of 50 SWG nichrome wire wound on a layer of oiled silk insulation around the bimetallic strip 5, having a resistance of 19,000 ohms and designed for operation on 40 volts. The heater element occupies about one half of the length of the bimetallic strip 1. The contacts 11 and 13 are adjusted to make the temperature differential of the thermostatic device no more than 1 degree F.

Figure 4:
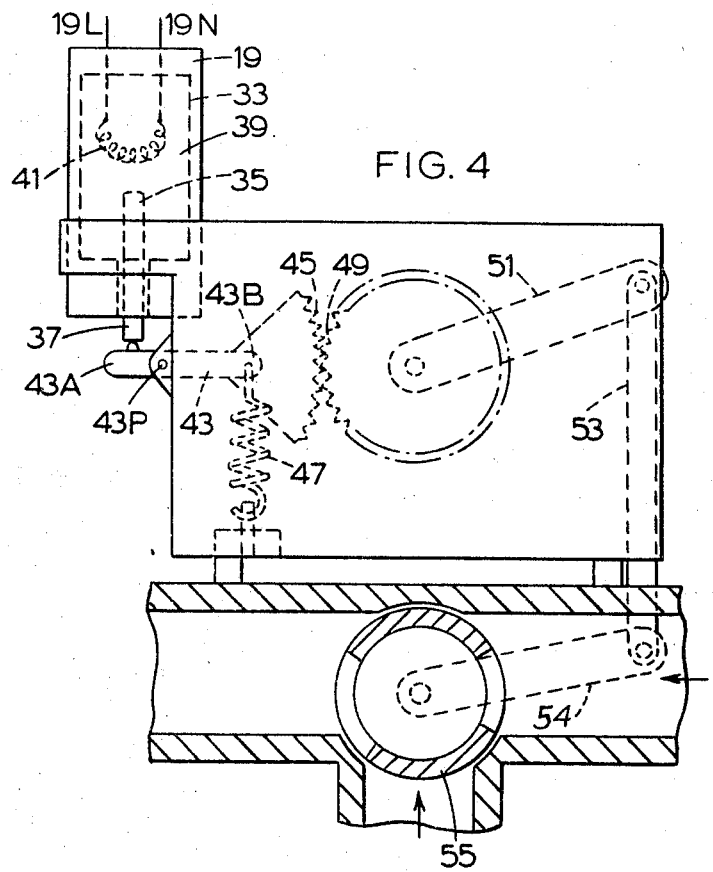
FIGURE 4 is a diagrammatic representation of the motor shown in FIGURE 3 and the valve actuated by that motor.

The electric motor 19 is a wax filled thermal motor which is illustrated only diagrammatically in FIGURE 3 but is shown in more detail in FIGURE 4. The motor includes a cylinder 33 containing an end part 35 of a spindle 37 which constitutes a ram and slides axially through a gland at the end of cylinder 33. The remainder of the cylinder 33 is filled with a wax 39, and a heating winding 41 is immersed in this wax and has its ends connected to leads 19L and 19N respectively. The winding 41 has a resistance of 19.5 ohms and is adapted for use with a supply of 22 volts. The outer end of spindle 37 engages one arm 43A of a lever 43 which is pivoted on a pin 43P and has a second arm 43B which carries an arcuate gear sector 45. A tension spring 47 acting between the arm 45B and a fixed bracket keeps the arm 43A pressed against the end of spindle 37. Gear sector 45 engages a complementary gear wheel 49 mounted on a shaft which carries a lever arm 51 coupled by a mechanical link 53 to an arm 54 carried by the operating shaft of a rotary valve 55. Valve 55 is the flow controlling valve of a space heating radiator.

Considering the operation of the system shown in FIGURES 3 and 4, if the controlled temperature is below the set temperature, the bimetallic strip 1 will be in its upper limiting position and contacts 9 and 11 make. No current will flow through the thermal motor 19, the wax therein will be cold, and the spindle 37 will assume its innermost position. Current will flow from live supply terminal L through the contacts 9 and 11 and the heater element 17 to the supply terminal N. The energisation of the heater element 17 warms the bimetallic strip 1 and tends to warp it so that it moves away from contact 11. The sensitivity of the bimetallic strip and the proximity of the heater winding thereto cause this to occur in a time range reduced to 10 to 90 seconds, the actual time depending upon the thickness and the number of layers of the oiled silk. When the contacts 9 quit the contact 11 and make the contact 13, the current through heater element 17 is broken, and at the same time current can flow from supply terminal L through contacts 9 and 13 and the heating winding 41 of the thermal motor 19 to the supply terminal N.

The current in the heating winding 41 raises the temperature of the wax 39, which expands and forces the ram spindle 37 outwardly of the cylinder 33 against the force set up by the spring 47, and closes the rotary valve 55 through the mechanical linkage consisting of the lever 43, gear sector 45, gear wheel 49, lever 51, link 53 and arm 54.

Figure 5:
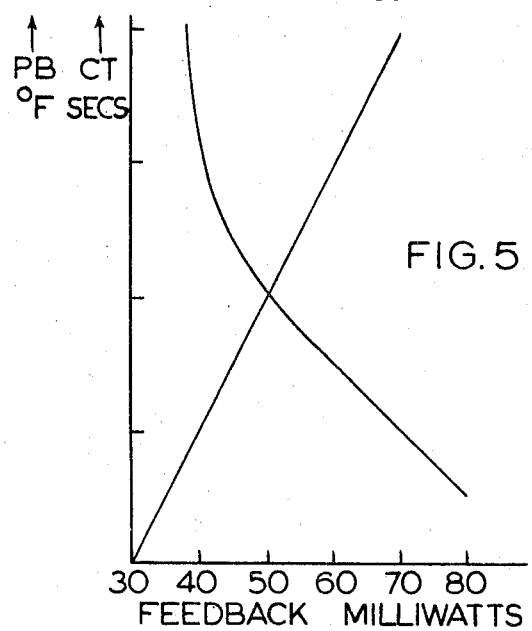
FIGURE 5 is a graphical representation of certain operating characteristics of the device shown in FIGURE 3.

Since the current through the heater element 17 is broken, the heater element cools in a relatively short time sufficiently to made the bimetallic strip 1 straighten sufficiently for contacts 9 to quit contact 13 and reengage contact 11. This alternate energisation and deenergisation of the heater element 17 continues in a cyclic manner. The rate at which this cyclic action repeats depends upon the sensitivity of the bimetallic strip 1, the amount of power applied to the heater element 17, and the rate of cooling of the bimetallic strip 1 when the heater element is not energised. The curve CT in FIGURE 5 shows how the cycle time varies with variation in the milliwatts power supplied to the heater element 17 when that heater element is energised, in the particular thermostatic device being described. For other thermostatic devices the same type of relationship will exist, although the actual values will be different. In the device shown, a total cycle time of approximately 35 seconds can be achieved by applying a power of about 80 milliwatts to the heater element 17, and this power is produced with an applied voltage of about 40 volts.

As mentioned above, the cycle time is affected by the ambient temperature of the bimetallic strip. As the controlled temperature rises towards the set temperature, the rate of cooling will decrease, so that the "cooling" time will increase and the "heating" time will decrease. This means that the circuit through contacts 9 and 13 will remain closed for a greater proportion of each cycle, i.e., the mark/space ratio of the current applied to the thermal motor 19 will increase as the controlled temperature rises towards the set temperature.

When the heating winding of the motor 19 is energised, the valve 55 tends to close, and when the motor 19 is deenergised that valve tends to open. Since the speed of response of the motor 19 is slow in terms of the time of the cyclic opening and closing of the energising circuit, the motor temperature and thus the position of its ram spindle 37 will depend upon the mark/space ratio of its intermittent heating current. Initially, when the mark/space ratio is low, the heating will be small, and the valve 55 will remain nearly fully open. As the mark/space ratio increases with an increase in the controlled temperature, the heating will be larger, and the valve 55 will progressively assume a more-and-more closed position. If the controlled temperature exceeded the set temperature, so that contacts 9 and 13 remained in the "made" state, then the thermal motor 19 would be continuously energised and the valve 55 would close completely. If the rating of the heating means controlled by the valve 55 is greater than the maximum demand, then this condition will not be reached, and when the controlled temperature is slightly below the set temperature the heater element will periodically bring the temperature of the bimetallic strip 1 slightly above the set temperature and (when deenergised) will then permit it to fall slightly below the set temperature.

The degree of negative feedback applied in the above manner by the action of the heater element 17 can vary between 2° F. and 20° F., and the proportional band of the controller will vary accordingly. In FIGURE 5 the curve PB shows the variation in the proportional band of the thermostat with variations in the feedback power, in milliwatts, applied to the heater element 17 when it is energised.

A further degree of negative feedback is set up by the transfer of heat from the heating medium controlled by the valve 55 to the thermal motor 19. This may take place directly or through the valve body. As the temperature of the valve body rises when the valve 55 is opened, some of the heat received by the valve body passes to the wax 13 in the thermal motor. This has the effect of countering some of the cooling of the wax which would normally take place during periods when the heating winding 41 is not energized, and this by cancelling some of the "opening" movement of the motor due to the pressure of the spring 47 applies negative feedback stabilization to the control loop.

Figure 6:
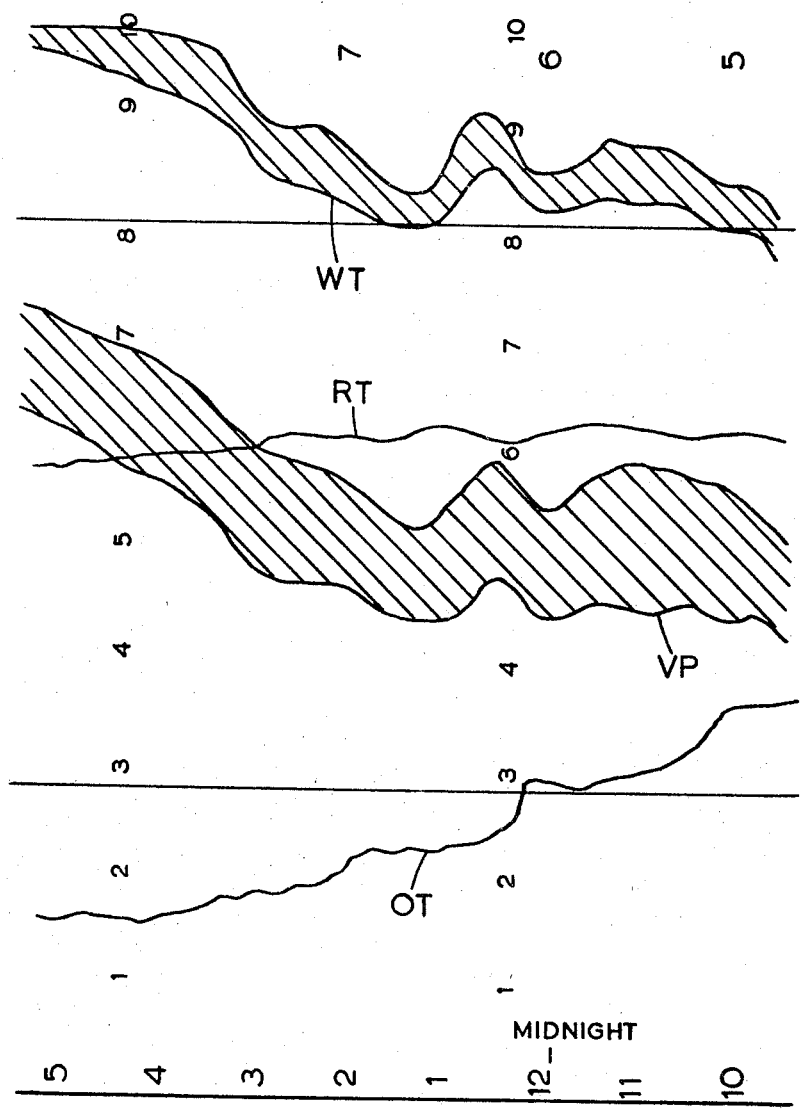
FIGURES 6 and 7 are graphical representations similar to FIGURE 2 but appertaining to the device shown in FIGURE 3.
Figure 7:
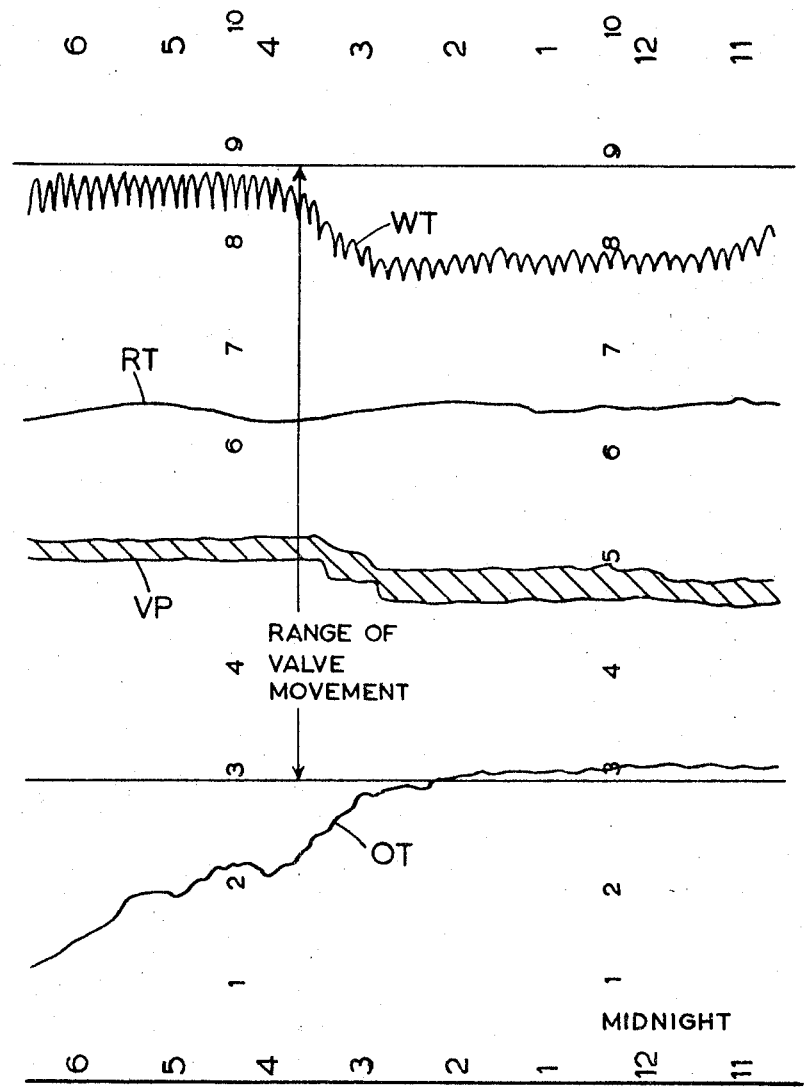

FIGURES 6 and 7 correspond to FIGURE 2 but show the operation of the thermostatic device shown in FIGURES 3 and 4 with two different ratings of feedback power. FIGURE 6 shows the effect of a proportional band of only 2° F. while FIGURE 7 shows the effect of a proportional band of 4° F. As in FIGURE 2, the curves denote room temperature (trace RT), outside temperature (trace OT), valve position (trace VP) and controlled water temperature (trace WT). Referring first to FIGURE 6, the proportional band of only 2° F. in combination with the chosen time constant and the response time of the thermal motor 19 produces a behaviour quite different from that produced in the system of FIGURE 1. Instead of carrying out an oscillation of 100% in the rate of flow of the heating water, the movement of the motor has been reduced to an oscillation of only 10–18%, producing changes in the hot water temperature for a given stable heating load of less than 5° F., which is only a tenth to a fifteenth of that occurring with the system of FIGURE 1. No oscillation is apparent in the room temperature characteristic (trace RT) arising from valve movement, in this case using a 40 second cycle for the bimetallic strip 1, but the whole control system take up an insufficiently damped oscillation with a time cycle of about 1¼ hours due to the narrowness of the proportional band.

Referring now to FIGURE 7, the proportional band is widened to 4° F. and in consequence the control loop is now nearly aperiodically damped. The valve 55 moves by not more than 7% of its full travel betwen its fully open and fully closed positions, and there is no influence of this oscillation on the hot water temperature. Some oscillations in the hot water temperature (trace WT) are apparent, but these result from the action of an on-off controller which switches the gas flame of a hot water boiler, by which the water is heated, on and off. The control loop normally has a proportional band of 8° F., but due to the effect of feedback arising from heat conduction from the hot water to the thermal electric motor 19, the proportional band is reduced to 4° F. The 7% oscillations of the valve 55 shown in trace VP in FIGURE 7 are taking place when the thermostat is operating with a cycle time (due to the action of the heater element 17) of approximately 30 seconds. Thus the 7% movement represents a 15 second pulse to the electrical motor 19. From this it follows that on the average that the time for the total movement from open to closed is 15×100/7 seconds, i.e., 3 minutes 35 seconds. To reduce the time of response it is advisable to cut out the upper and lower 20% of the heating/cooling cycle, and a manner in which this can be achieved is indicated in FIGURE 10, which will be described in detail below.

It will be obvious that by use of the temperature controlling system which has been described above the discomfort caused by the alternation of the temperature of radiators between an upper level and a lower level is avoided, and the conditions of comfort obtained are those given by a proportional controller.

In an extensive heating system in which it is desirable to open all the valves, associated respectively with different radiators, at night, this can be achieved easily by switching off the mains supply to the thermostat.

Figure 8:
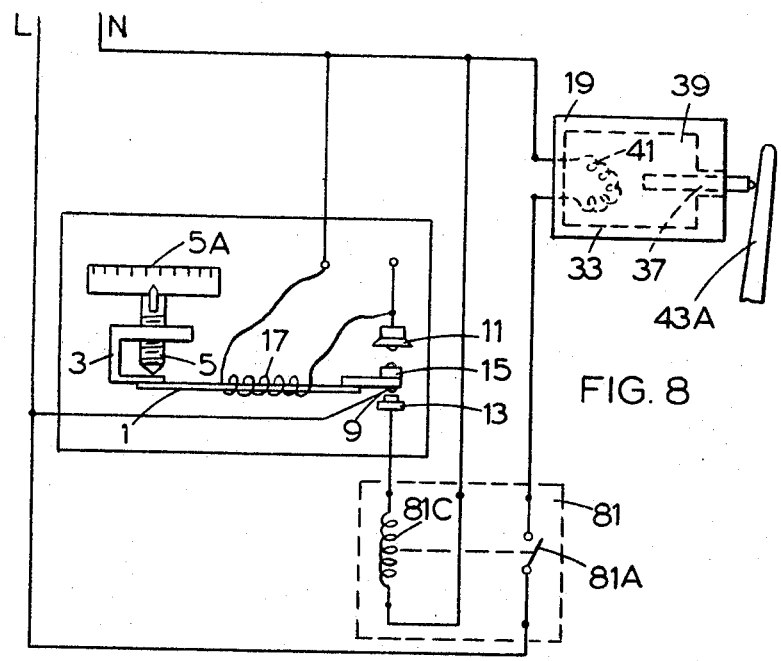
FIGURES 8 and 9 illustrate alternative embodiments of the device shown in FIGURE 3.

In the arrangement shown in FIGURE 8, a relay 81 is provided with an operating coil 81C, and this coil is connected between contact 13 and supply terminal N instead of the motor 19. The motor heating winding 41 is connected in series with the normally open contacts 81A of the relay between the supply terminals L and N. This arrangement is useful if the current to be taken by the motor is large, or if the one thermostat is to control several such motors simultaneously, so that the total motor current to be switched is relatively large.

Figure 9:
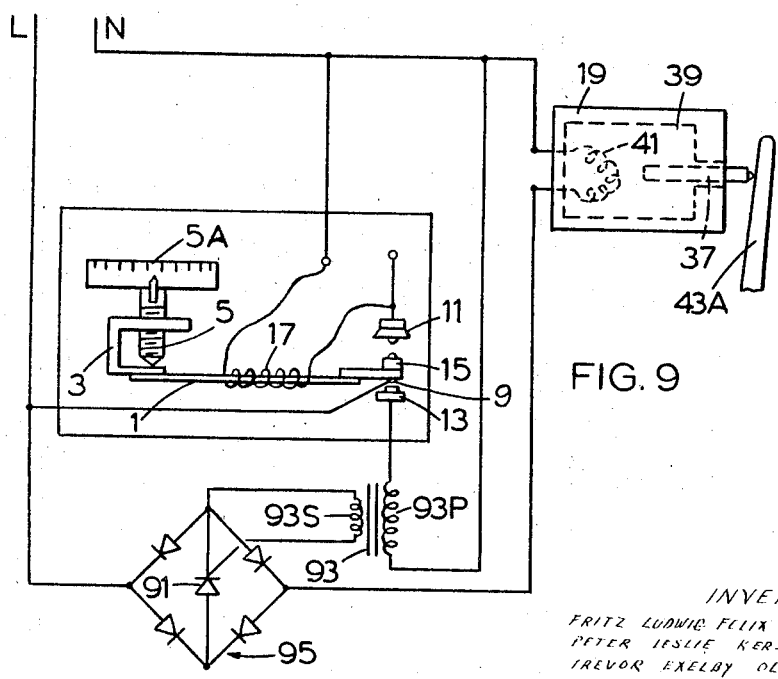

In the arrangement shown in FIGURE 9, the motor 19 is switched through a solid state device, namely a silicon controlled rectifier 91. In this arrangement, instead of the motor 19 being connected between contact 13 and the supply terminal N, the primary winding 93P of a transformer 93 is connected between contact 13 and supply terminal N. The secondary winding 93S of that transformer is connected between the cathode and the trigger electrode of the rectifier 91. A full-wave bridge rectifier circuit 95 has one pair of opposite corners connected respectively to the supply terminal L and, through the heating winding of the thermal motor 19, to the supply terminal N. The anode and the cathode of the silicon controlled rectifier 91 are connected respectively to the other two corners of the bridge circuit. When the controlled temperature is appreciably below the set temperature, the primary winding 93 remains unenergised. When, as a result of the action of the heater element 17, contacts 9 and 13 make, a current flows from the supply terminal L through contacts 9 and 13 and the transformer primary winding 93P to the terminal N of the supply. The initial buildup of this current induces a voltage in the transformer secondary winding 93S and this triggers the silicon controlled rectifier 91 so that it commences to conduct. While this rectifier is conducting, current can flow from the supply terminal L through the bridge circuit 95 to energise the heating winding of the thermal motor 19.

Referring now to FIGURE 10, this shows diagrammatically a modification of the arrangement of thermal electric motor and flow controlling valve shown in FIGURE 4. This electric motor 19 is shown coupled to a flow controlling valve 101 having an inlet 101I, and outlet 101O, and a valve closure member 101C. The motor includes a cylinder 33 containing an end part of a spindle 37 which carries the valve closure member 101C. This spindle end part 35 constitutes a ram and slides axially through a gland at the end of cylinder 33. The remainder of the cylinder is filled with a wax 39, and the cylinder is encircled by a heating winding 41, the ends of which are connected to leads 19L and 19N respectively. The spindle 37 is biased axially inwardly of the cylinder by a compression spring 47 which acts between a circlip 103 carried by the spindle 37 and an abutment on the valve body. The cylinder 33 is not fixed rigidly to the valve body, but can move axially in a direction away from the valve closure member 101C against the biassing force of a compression spring 105 acting between the valve body and a flange member 107 carried by the cylinder 33.

Energisation of the heating winding 41 causes the wax 39 to warm and expand. This expansion forces the ram spindle 37 outwardly of the cylinder 33 against the biassing force of the spring 47, thus moving the valve closure member 101C to its closed position. When the valve is fully closed, so that the closure member abuts against its seating, the last 20% of the expansion of the wax (if the heating winding is continuously energised) is absorbed by axial movement of the cylinder 33 in the opposite direction against the biassing force of the spring 105. When the heating winding 41 is deenergised, initially the cylinder returns to its normal position, and then the valve closure member commences to move away from its seating, so that the valve becomes progressively more and more opened. The arrangement of FIGURE 10 allows a greater amount of negative feedback by heat transfer from the valve.

If desired the arrangement shown in FIGURE 3 can be modified by the inclusion of a suitable resistor 111 between the contact 11 and the motor terminal 19L so that when the heating winding 41 is not energised by the open state of contacts 9 and 13, a small standing current will flow through the heating winding 41 to slow the cooling rate of the wax, so resulting in a slower rate of "opening" of the valve.

When the thermostat is to be used to control air ducted heating installations, it is possible to provide a simple system of low limit control by using two of the described thermostats with their contacts connected in series as shown in FIGURES 11 and 12.

FIGURE 11 shows the layout of such a system, in which a room 121 is supplied with air heated by passing over a heat exchanger 123 and passing to the room through a duct 125 in which is arranged a thermostat 127. A further thermostat 129 is disposed at a suitable location in the room. The heat output from the heat exchanger 123 is controlled by a flow regulating valve 131 actuated by a motor 133 and arranged to control the flow of hot water from a supply main 135 and cooler water from a return main 137 to the heat exchanger 123. FIGURE 12 shows how the two thermostats are connected to control the motor 133. The two thermostats are similar to that shown in FIGURE 3, and the motor 133 is similar to the motor 19 shown in FIGURE 4. Supply terminal L is connected to contact 9 of thermostat 129, contact 13 of which is connected to contact 9 of thermostat 127.

The thermostat 129 is arranged to control the air temperature in the room 121 in the manner described, in connection with FIGURES 3 and 4 above. Shutting off the power to the motor 133, as in that case, results in an increase in the room temperature. The thermostat 127 disposed in the duct 125 is set to a temperature which is the normally acceptable low temperature limit of the supply duct air. In normal control conditions, the temperature of the air in the duct will be above the set temperature of this thermostat 127, so that its contacts 9 and 13 will be "made," and remain closed as long as the temperature of the air in the duct is above the proportional band of this thermostat. The valve motor 133 is then controlled completely by the action of the room thermostat 129 in the manner described above.

However, if for any reason the temperature of the air in the duct 125 falls below the set temperature of the thermostat 127, contacts 9 and 13 would break and the motor 133 would be deenergised so that the valve 131 would be open to increase the heat input through heat exchanger 123. The contacts 9 and 13 of the room thermostat 129 would in these conditions tend to remain closed since the heat input to the room will be increased, so that the temperature will tend to rise above the set temperature of the room thermostat. They will remain continuously closed once the room temperature is above the upper limit of the proportional band. In these circumstances the temperature in the air duct will be controlled by the contacts of the duct thermostat 127 in the manner described above in connection with FIGURES 3 and 4. If the duct temperature should rise above the set temperature of the duct thermostat 127, the contacts 9 and 13 of that thermostat will make, so initiating closure of the valve 131, and the room thermostat 129 will regain control of the system. It will be seen that this arrangement enables the inclusion into the system of a low temperature limit control for the ducted air which prevents the temperature of the air being discharged into the room from the duct becoming too low for comfort, and this arrangement does not require any complicated circuitry.

Figure 13:
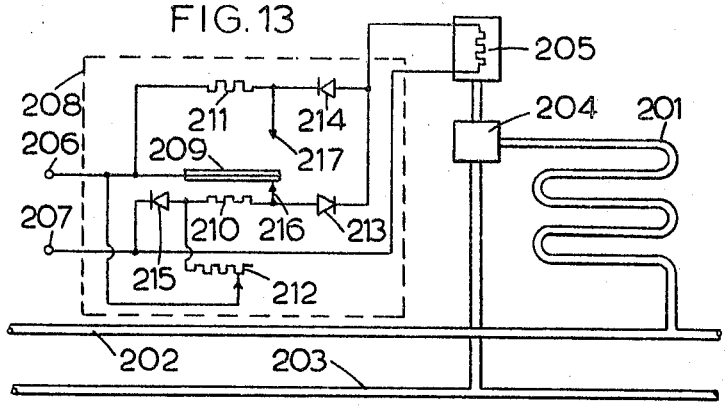
FIGURE 13 is a schematic representation of a heat exchanger forming part of an air conditioning installation and of control means associated with that heat exchanger.

Referring now to FIGURES 13 and 14, a heat exchanger 201 is connected between a water supply main 202 and a water return main 203 in series with a flow controlling valve 204. The heat exchanger can be a space heating radiator, or the heat exchange element of a fan heater, or the main heat exchanger in a centralised air heater from which hot or cold air is distributed through a system of ducts. Mains 202 and 203 are connected by suitable two-way valves (not shown) alternatively to a water heater and to a water cooler, so that as desired either hot water or cold water can be supplied to the heat exchanger 201. The heat exchanger 201 is part of an air conditioning installation and is used to heat air flowing over it during winter conditions and to cool air flowing over it during summer conditions. The valve 204 is actuated by a thermal motor 205, which includes a spindle which carries the valve closure member and is biassed to the valve closed position by a compression spring. Part of the motor spindle extends as a piston within a cylinder which contains wax and is encircled by a heater winding. When the heater winding is energised, the wax expands and moves the piston to open the valve. When the heater winding is deenergised, the wax shrinks and the spring is effective to move the piston and so close the valve 204.

Figure 29:
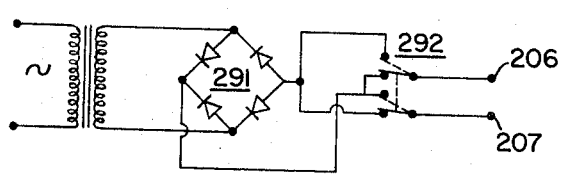
FIGURE 29 is a circuit diagram of a master controller for use with the control means shown in FIGURES 13 to 21.

A master controller is arranged to reposition two-way valves associated with the water mains (not shown) and at the same time to control electric switching means. The circuit of the master controller is shown in FIG. 29 and consists of a unidirectional voltage source 291 connected to two terminals 206 and 207 through a changeover switch 292. This master controller is effective in one condition to supply hot water (preferably at a temperature above 90° F.) to the heat exchanger 201 and, as shown in FIG. 29, at the same time, to apply the unidirectional voltage to the terminals 206 and 207 so that terminal 206 is positive and terminal 207 is negative, and in another condition (in which the change-over switch 292 is operated) to supply cold water (preferably at below 50° F.) to the heat exchanger 201 and at the same time to apply the unidirectional voltage to the two terminals 206 and 207 so that terminal 207 is positive and terminal 206 is negative.

Terminals 206 and 207 are input terminals of a thermostat 208 having a temperature sensitive actuator in the form of a bimetallic strip 209 and which is exposed to the temperature which is to be controlled, for example to the air in a space which is heated by air caused to flow over the outer surfaces of the heat exchanger 201. The thermostat also includes a first auxiliary electrical heater element 210, a second auxiliary electrical heater 211, and a third auxiliary electrical heater element 212. Terminal 206 is connected to the bi-metallic strip 209. Heater element 210 is connected in series with two oppositely directed diodes 213 and 215 between the terminal 207 and a first end of the heater winding of the thermal motor 205. Terminal 207 is connected directly to the second end of that winding. Heater element 211 is connected in series with a rectifier 214 between terminal 206 and the first end of the heater winding of the motor 205. The junction of heater element 210 and rectifier 213 is connected to a first contact 216 which is contacted by the bimetallic strip 209 when that strip is at a temperature below a "set temperature." The junction of heater element 211 and rectifier 214 is connected to a second contact 217 which is contacted by the bimetallic strip 209 when that strip is at a temperature above the "set temperature." Heater element 212 is connected between terminal 206 and the junction of heater element 210 and rectifier 215.

Referring now to FIGURE 14, the bimetallic strip 209 is mounted at one end on a spring 219 which in turn is mounted on a fixed support 220. At its other end the bimetallic strip carries a support member 221 upon which is mounted a pair of oppositely directed contacts 222, and a permanent magnet 223 which cooperates with a fixed magnetic member 224 to cause the free end of the bimetallic strip to move with a snap action between its two limiting positions in which its contacts engage respectively the two contacts 216 and 217. The spring 219 biasses the bimetallic strip 209 so that a leaf member 225, which is fixed to and moves with this end of the bimetallic strip, presses at all times against the upper end of a threaded stud 226. The lower end of the stud 226 is provided with an enlarged head 227 the periphery of which is marked with a temperature scale. Stud 226 is screwed into a fixed nut 228 carried by the support 220, so that rotation of the head 227 moves the scale markings past a fixed point 229 and biasses the leaf member 225 upwardly to a variable extent. This setting of leaf member 225 effects a vertical adjustment of the two contacts 222 between the two contacts 216 and 217 to change the set temperature of the thermostat 208.

Heater element 212 is shown diagrammatically in FIGURE 13 as a variable resistive element, but in fact the heater element 212 is connected in series with a variable resistor 230, and the heat generated by heater element 212 is varied by repositioning of a slider 231 which moves over the resistive element of resistor 230. Slider 231 carries a pointer 232 which moves over the scale marked on the periphery of the head 227 of stud 226.

In use of the apparatus shown in FIGURES 13 and 14 and described above, the master controller will be set either to heat the building which the air conditioning installation serves, or to cool that building. When the building is to be heated, the master controller causes hot water to be supplied through supply main 202 to the heat exchanger 201, and to cause water leaving that heat exchanger to return through the return main 203 to the heating installation by which the water is reheated and returned to supply main 202. At the same time, the master controller supplies a unidirectional voltage to the terminals 206 and 207 in such a maner that terminal 206 is positive.

When the building is initially too cold, the temperature of the bimetallic strip 209 will be such that the lower contact 222 will engage the contact 216. Direct current will then flow from positive terminal 206 through the strip 209, contacts 222 and 216, rectifier 213 and the heater winding of the thermal motor 205 to the negative terminal 207. The heater winding will heat the wax in the thermal motor, and this will expand to cause the valve 204 to commerce to open. When the lower contact 222 is in contact with the contact 216, a direct current can also flow from positive terminal 206 through the bimetallic strip 209, the contacts 222 and 216, the first auxiliary heater element 210 and the rectifier 215 to the negative terminal 207.

Since the valve 204 is fully open, hot water is permitted to flow through the heat exchanger 201 and the heat exchanger is then effective to heat the air within the building. Energisation of the first auxiliary heater 210 causes the bimetallic strip to heat and to warp so as to break the contact between contacts 222 and 216 long before the air within the building has become noticeably heated. This contact separation deenergises the thermal motor 205, so that the wax therein begins to cool and the valve 204 commences to close. At the same time, this contact separation deenergises the first auxiliary heater 210, and the bimetallic strip 209 cools until its contacts 222 again engage the contact 216. The rate of cooling will depend upon the ambient temperature to which the bimetallic strip is exposed. When the building is cold, this cooling will take place quickly compared with the cooling of the wax in the thermal motor 205, and the valve 204 will not close appreciably before the contacts 222 of the bimetallic strip 209 remake with the contact 216. The mark/space ratio of the supply of current to the thermal motor 205 will thus be sufficiently high, when the building is cold, for the valve 204 to reach its fully open position.

As the building warms up, the ambient temperature to which the bimetallic strip 209 is exposed increases, and the mark/space ratio of the current to the thermal motor 205 reduces since it takes longer for the bimetallic strip 209 to cool down sufficiently, after each heating by the heating element 210, to make the contacts 222-216. As this mark/space ratio falls, the effective rate of supply of heat to the thermal motor falls, and the valve 204 progressively assumes a more and more closed position. When the temperature in the building reaches or exceeds the set temperature, the bimetallic strip 209 no longer cools sufficiently to make the contacts 222-216, and the valve 204 tends to close fully. In practice, since the building will be losing heat continuously, the valve 204 will close progressively until the average heat input to the building through the heat exchanger 201 equals the average heat loss from the building, and the valve 204 will then remain at a substantially constant setting, since the time lag in cooling down of the thermal motor 205 is much greater than the period of the cyclic heating and cooling of the bimetallic strip 209 set up by the action of the heating element 210 and the making and breaking of the contacts 222-216. The temperature in the building settles to a value less than the set temperature by an amount known as the "offset."

Should the bimetallic strip warp sufficiently for the upper contact 222 to engage the upper contact 217, no current flow through these contacts will be set up since the second rectifier 214 is so arranged as to stop any current flowing with the terminal 206 positive.

When the building is to be cooled, the master controller is set so as to cause cold water to be supplied through supply main 202 to the heat exchanger 201, and water leaving the heat exchanger to return through the return main 203 to the cooling installation by which the water is cooled and returned to supply main 202. The cooling installation comprises a refrigerating compressor plant. At the same time, the master controller supplies a unidirectional voltage to the terminals 206 and 207 in such a manner that terminal 207 is positive.

When the building is initially too hot, the temperature of the bimetallic strip will be such that the upper contact 222 will engage the contact 217. Current can then flow from the positive terminal 207 through the heater winding of the thermal motor 205, the rectifier 214, the contacts 217-222 and the bimetallic strip 209 to the negative terminal 206. The resistance of the current path through contacts 217-222 and the bimetallic strip 209 is much less than the resistance of the second auxiliary heater element 211, which is thereby effectively shunted and develops substantially no heat. The heater winding of the motor 205 will heat the wax in the thermal motor, and this will expand to cause the valve 204 to commence to open. Initially the temperature in the building will probably be sufficiently high for the thermal motor 205 to continue to be fully energised until the valve 204 is in its fully open position.

Since the valve 204 is fully open, cold water is permitted to flow through the heat exchanger 201 and the heat exchanger is then effective to cool the air within the building. This action will continue until the temperature of the air in the building, and thus the temperature of the bimetallic strip 209, has fallen sufficiently for the bimetallic strip to snap from upper contact 217 to engage lower contact 216.

The breaking of the contacts 217-222 removes the shunt from the auxiliary heater element 211, which now carries an appreciable current and commences to give out heat. This heater element is in series with the heater winding of the motor 205, and the ratio of the resistances of the auxiliary heater 211 and the motor heater winding is such that the current in the motor heater winding falls considerably to a value such that the thermal motor is effectively deenergised, so that the motor starts to cool and the valve 204 then commences to close. The bimetallic strip 209 is heated by the second auxiliary heater 211 until the contacts 222-217 again close, whereupon the heater 211 is rendered ineffective and the motor 205 is effectively energised so as to cause the valve 204 to commence to reopen. Again, the rate of cooling of the bimetallic strip 209 will depend upon the ambient temperature to which the bimetallic strip is exposed. When the building is hot, this cooling will take place relatively slowly, and as the building cools, this cooling of the bimetallic strip will take place more and more quickly. As a result, as the building cools, the mark/space ratio of the effective current flow in the heater winding of the thermal motor 205 will decrease, so that the average value of the current through that motor will decrease and the valve 204 will tend to close progressively. This will continue until the cooling effected by the heat exchanger 201 is sufficient to maintain the temperature inside the building at a value less than the set temperature by an amount known as the "offset."

It will be seen that during cooling of the building the third auxiliary heater element 212 is unable to pass any current because of the polarity of the rectifier 215. The operation of the bimetallic strip 209 then depends completely upon the ambient air temperature and the intermittent heating effect of auxiliary heater element 211. However, during heating of the building, i.e., when the terminal 206 is positive, the auxiliary heater element 212 is continuously energised, and the operation of the bimetallic strip 209 then depends upon the ambient temperature, the continuous background heating from the heater element 212, and the intermittent heating by the heater element 210.

The effect of energisation of the third auxiliary heater element 212 is to apply a thermal bias to the bimetallic strip, so that without any need to change the set point of the bimetalic strip 209, the thermostat operates at a lower temperature during heating of the building than during cooling of the building. This means that the set temperature of the thermostat can be higher than would otherwise be the case, without overloading the heating apparatus during heating (because the effective set temperature is automatically lowered), and this higher set temperature during cooling enables the use of a cooling plant of lesser capacity and reduction in power consumption by the cooling plant. The current in the auxiliary heater element 212 can be adjusted by means of the variable resistor 230 in order that the extent to which the controlling point of the thermostat 208 is lowered (during heating) can be varied.

As mentioned above, the terminals 206 and 207 have applied to them a unidirectional voltage, and desirably this unidirectional voltage is derived from an alternating current source through a rectifier with little if any smoothing, so that although unidirectional the applied voltage fluctuates cyclically at mains frequency between a maximum value and a lower value which may be zero. This reduces arcing at the contacts 216 and 217, and so lengthens the life of those contacts. The thermal motor which has been described is preferable since it has a relatively slow response to changes in current, but other electrically energised actuators can be used instead. In most installations, an electrically driven fan will be provided to promote the flow of air over the heat exchange surfaces of the heat exchanger 201.

Figure 15:
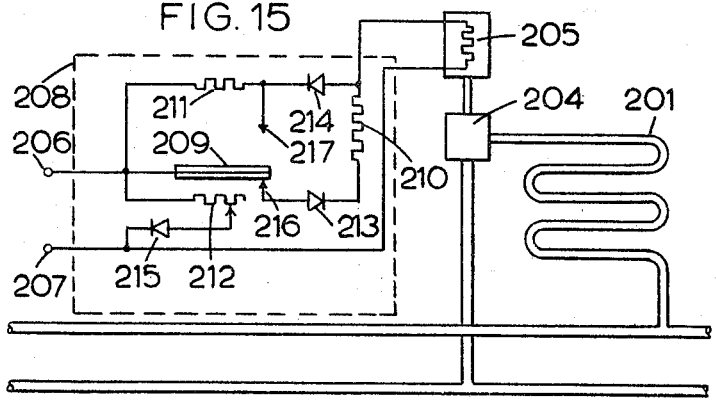
FIGURES 15 and 16 illustrate alternative embodiments of the device of FIGURE 13.

Referring now to the embodiment of the invention shown in FIGURE 15, in many respects this embodiment is similar to that shown in FIGURE 13, and the same numerals are utilised to denote corresponding parts. In this arrangement, the first auxiliary heating element 210 is included in the series path between rectifier 213 and the heating winding of the thermal motor 205, and it is necessary that the ratio of the resistances of the heating winding of motor 205 and the heater element 210 shall be such that the motor 205 is fully energised when contacts 222–216 are made. The operation of the circuit of FIGURE 15 is substantially the same as the operation of the circuit of FIGURE 13.

Figure 16:
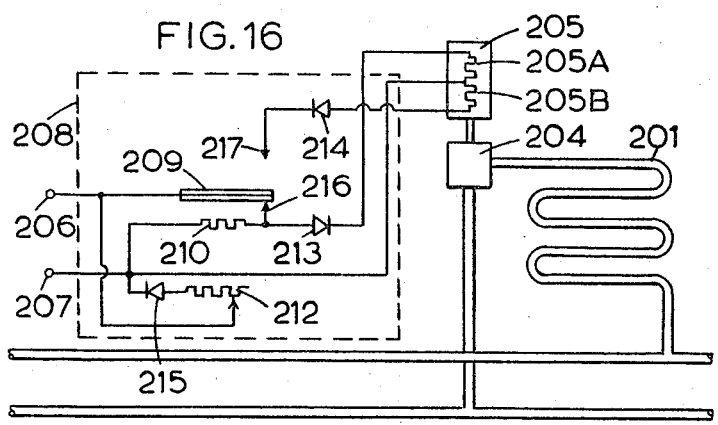

The circuit of FIGURE 16 is similar to that of FIGURE 13, but in FIGURE 16 the thermal motor has two heating sections 205A and 205B which may be separate windings, or sections of the same heating winding, these two heating elements being connected in the current path from rectifier 213 to rectifier 214, but having their junction connected to the terminal 207, instead of having the end of the terminal of the motor 205 which is remote from the terminal 207 being connected to that rectifier. Further, heater element 210 is connected directly to terminal 207. During heating of the building, this makes no difference in the operation of the circuit, except that only section 205A of the motor heating winding is effective. Should the bimetallic strip 209 contact the terminal 217, no current can flow since the rectifier 214 would be back biassed. During cooling of the building, the temperature inside the building will initially be above the set temperature, so that the bimetallic strip 209 will contact the upper terminal 217, while terminal 207 will be the positive supply terminal. Current will therefore flow from terminal 207 through section 205B of the heating winding of the thermal motor 205, the rectifier 214, the contacts 217–222 and the bimetallic strip 209 to the terminal 206. No current will pass through the winding section 205A since no E.M.F. exists across that section. This current will cause operation of the motor 205 and opening of the valve 204. Cooling of the air flowing over heat exchanger 201 to the building will commence. None of the heater elements or sections 205A, 210 or 212 are energised until the bimetallic strip becomes so cooled, by the reduction of the air temperature in the building, that it breaks the contact with contact 217 and makes with contact 216. Thereupon a current flows through heater element 210, and no current flows from terminal 207 through motor heater winding section 205B. The wax in the thermal motor 205 tends to cool, and the valve 204 tends to close, so reducing the rate of cooling of the building. The energisation of the heater element 210 heats up the bimetallic strip 209 and after a brief interval the bimetallic strip 209 breaks the contacts 222–216 and makes the contacts 222–217, causing the heater element 210 to become deenergised and the motor winding section 205B to become energised, tending to open the valve 204. This cycle of events continues, the mark/space ratio of the current in the motor 205 becoming smaller as the temperature within the building falls, so that the valve moves slowly towards a closed position until the cooling effected by the heat exchanger 201 is sufficient to maintain the temperature within the building at a substantially constant value.

The embodiments of the invention shown in FIGURES 13, 15 and 16 can be modified similarly to produce the embodiments of FIGURES 17, 18 and 19 by the replacement of the thermal motor 205 and valve 204 with a direct current motor 205 arranged to drive a fan 218 which by its speed controls the rate of flow of air over the heat exchanger 201 and thus the rate of transfer of heat between the heat exchanger and the air.

During use of the various embodiments of the invention described above, the arrangement of FIGURE 14 provides two adjustments of the set temperature of the thermostat, namely the axial adjustment of the stud 226, as indicated by the reading on head 227 opposite pointer 229, determining the nominal set temperature (which during cooling is the actual set temperature) and the setting of the slider 231 of the resistor 230 as indicated by the reading on head 227 opposite pointer 232, which provides an independent setting of the deviation, during heating, of the actual set temperature from the nominal set temperature.

Figure 20:
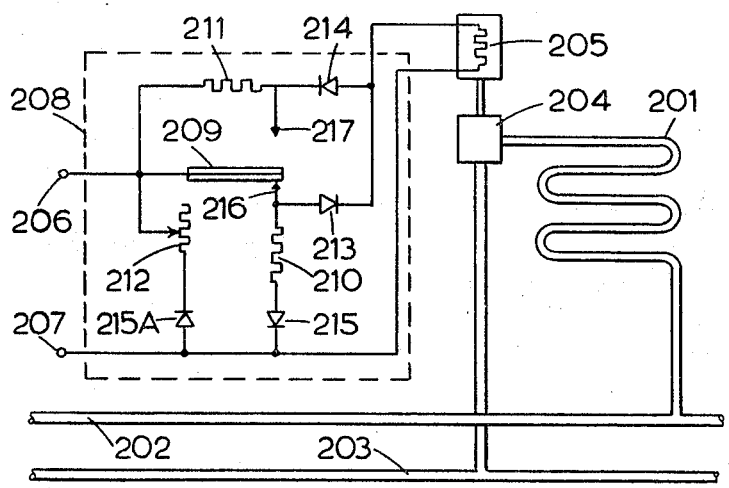
FIGURE 20 illustrates an alternative embodiment of the device of FIGURE 13.

The embodiment shown in FIGURE 20 is very much like that of FIGURE 13, but in this embodiment the heater element 212 is connected to the terminal 207 not through the rectifier 215 but through an auxiliary rectifier 215A. Further, in this embodiment the polarity of the voltages applied to terminals 206 and 207 are opposite to those in the embodiments previously described, the terminal 206 being negative when hot water is supplied to the heat exchanger 201. Furthermore, when the heating winding of motor 205 is energised, the motor operates to close the valve 204, and when the motor winding is not energised, this valve is spring opened. As a result of these two changes in the circuit, the overall operation of the circuit remains unchanged.

Figure 21:
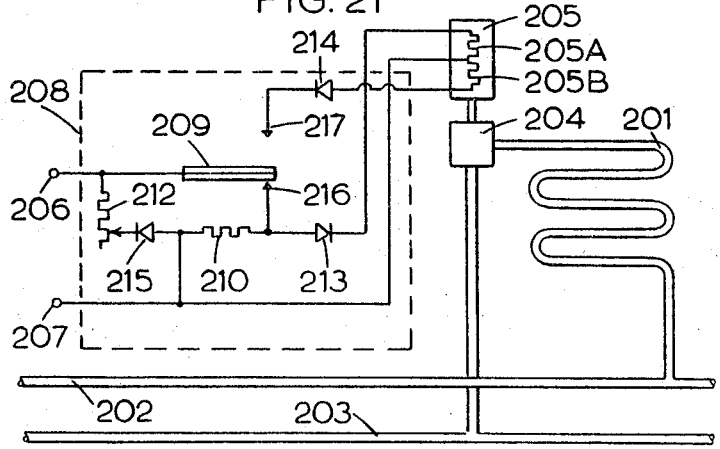
FIGURE 21 illustrates an alternative embodiment of the device of FIGURE 16.

The embodiment shown in FIGURE 21 is that shown in FIGURE 16, but again with the two counteracting modifications that the polarities of the voltages applied to terminals 206 and 207 are reversed and the arrangement of motor 205 and valve 204 again is that when the motor heating winding is energised, the valve is closed.

In the embodiment shown in FIGURE 22, the form of the thermostat 208 is different from that shown in the earlier figures in that the electrical supply to it is applied to three terminals, terminals 206, 207 and 238. In this embodiment, the thermal motor 205 closes the valve 204 when it is energised and permits a spring to open that valve when it is deenergised. The master controller in one condition supplies hot water to the heat exchanger 201 through the supply main 202 and at the same time connects terminal 206 to a live terminal or pole of a supply and connects both terminals 207 and 238 to the neutral terminal or pole of that supply; in its other condition the master controller supplies cold water to the heat exchanger 201 through the supply main 202 and at the same time connects terminals 206 and 238 to the live terminal or pole of the supply and connects terminal 207 to the neutral terminal. Thus at all times terminal 206 will be live and terminal 207 will be neutral, but terminal 238 will be either live (when heating is required) or neutral (when cooling is required). As in the other embodiments, a first auxiliary heater element 210 and an auxiliary heater element 212 are provided arranged to heat the bimetallic strip 209 when energised. In this embodiment, terminal 206 is connected to contact 217, terminal 207 is connected to contact 216, terminal 238 is connected to one end of the heater winding of motor 205 and the bimetallic strip 209 is connected to the second end of that heater winding. The heater element 210 is connected between this second end of the heater winding and the contact 217, and the heater element 212 is connected between the terminals 206 and 238. As in the embodiment of FIGURE 14, heater element 212 is in the form of a resistive heater element connected in series with a variable resistor, so that the current in the element 212 and thus the heat generated in it can be varied by adjustment of the resistor. As in the previous embodiments, the heater element 212 is effective to raise the effective value of the set temperature only when the master controller is set to produce heating. During heating, if the controlled temperature is below the set temperature, current will flow from terminal 206 through the heater element 210, the bimetallic strip 209 and contact 216 to terminal 207. The motor heating winding is not energised, and valve 204 therefore stays open, and the heat exchanger is effective to add heat to the space to be heated. The heater element 212 heats the bimetallic strip 209 and when its temperature reaches the set temperature, the bimetallic strip 209 breaks the contact with contact 216 and makes contact with the contact 217. When this happens, the heater element 210 is shunted and ceases to generate heat. At the same time, current flows from terminal 206 through contact 217, bimetallic strip 209 and the heating winding of motor 205 to the terminal 218. The motor 205 commences to close the valve 204. However, since the bimetallic strip 209 will be cooling down to the controlled temperature, before the valve 204 has closed appreciably the bimetallic strip 209 will quit the contact 217 and make with contact 216.

This operation is similar to that which has been described above in connection with the previous embodiments, and the heater element 210 will be cyclically energised and deenergised as the controlled temperature rises towards the effective set temperature, that is to say the set temperature as modified by the action of the heater element 212. The time taken for the bimetallic strip to cool down between periods of energisation of the heater element 210 will depend upon the controlled temperature, and as this temperature rises so the mark/space ratio of the current supplied to the motor 205 will increase, so that motor 205 will become progressively more and more effective to move the valve 204 to its closed position. The thermal lag in the operation of the motor 205 is large compared with the period of the one-off cycle of energisation of the heater element 210.

Eventually the valve 204 settles to a substantially stable position in which the heat supplied by the heat exchanger 201 is sufficient to maintain the temperature within the building at a substantially stable level at a temperature lower than the set point by an amount dependent upon the proportional band determined by the feedback effected by the action of the heater 210. By so disposing the thermal motor 205 that its action is influenced by heat received from the heat exchanger 201, a feedback effect is also obtained which permits operation within very narrow proportional bands.

During operation of the apparatus to produce cooling of the building, initially the bimetallic strip will engage the upper contact 217. Since the terminal 238 is now connected to the live pole of the supply, neither the heater elements 210 and 212 or the motor 205 is energised, and the valve 204 assumes its fully open position. When the controlled temperature falls below the set temperature, the bimetallic strip 209 will break from contact 217 and make with contact 216. This completes two circuits, one from terminal 238 through the motor 205, the bimetallic strip 209 and the contact 216 to the terminal 207, and the other from terminal 206 through the heater element 210, the bimetallic strip 209 and contact 216 to the terminal 207. Since the motor 205 is energised, it commences to close the valve 204. Since the winding 210 is energised, it heats up the bimetallic strip 209 until the strip breaks from contact 216 and makes with contact 217. Since the thermal lag in motor 205 is large compared with the time taken for the heater element 210 to raise the temperature of the bimetallic strip 209 to cause this change in position, the initial operation of the heater element 210 will cause little movement of the valve 204 towards its closed position. The bimetallic strip again cools below its set temperature, and the switching action is repeated. The lower the controlled temperature falls below the set temperature, the quicker the bimetallic strip cools down after heater element 210 is de-energised, so that the mark/space ratio of the current in the motor 205 increases and the valve 204 assumes a more and more closed position until the cooling effected by the heat exchanger 201 is sufficient to maintain the temperature inside the building at a value less than the set temperature by an amount dependent upon the amount of feedback effected by heater 210.

Proximity of the motor 205 to the heat exchanger 201 will cause some positive feedback to occur due to cooling of the motor, but since the cooling of the motor produced by such proximity will always be much smaller than the heating produced during heating action of the installation, this defect is usually acceptable. It if is not acceptable, the motor 205 must be thermally insulated from the valve 204 and the heat exchanger 201.

Referring now to the embodiment shown in FIGURE 23, this is similar to the embodiment of FIGURE 22, but utilises a thermal motor 205 which causes the valve 204 to tend to open when the motor is energised. To compensate for this, the polarity of the supply connected to the terminal 238 is reversed so that this terminal is live when heating is to take place and is neutral when cooling is to take place. In order that the heater element 212 shall be effective only during heating operation, it is connected between terminals 207 and 238. The operation of the circuit is substantially as has been described above. By the use of a valve 204 which is arranged to close when the motor 205 is not energised, a control system is provided in which failure of the electrical supply will ensure that the heat exchanger 201 becomes inoperative. This is important when the heating of the building is taking place.

It is sometimes desirable, during cooling of the building, to raise the effective set temperature of the thermostat as the temperature outside the building rises, in order that the shock experienced by persons entering the building, due to the sudden drop in temperature, shall be reduced. This would furthermore reduce the load on the cooling plant so reducing the running costs and permitting the use of a smaller and therefore cheaper refrigerating plant. Further, it is sometimes desirable, during heating, to raise the temperature within the building as the temperature outside the building falls in order to offset the discomfort which may be felt by occupants due to loss of heat by radiation to the cold surfaces of the windows and walls during cold weather.

Both of these desirable effects can be achieved if the voltage across the heater element 212 is varied in accordance with the magnitude and the sense of the deviation of the outside temperature from an optimum value indicated at A in FIGURE 24.

Figure 25:
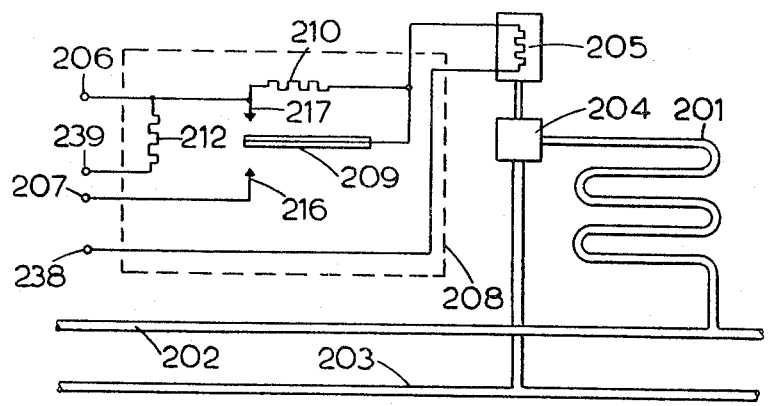
FIGURE 25 illustrates an alternative embodiment of the device of FIGURE 22.

The embodiment of the invention shown in FIGURE 25 is a modification of the embodiment shown in FIGURE 22, to produce these desired effects, and in this modification the heater element 212 is connected between terminal 206 and a further terminal 239, between which terminals is applied a voltage related to the deviation of the outside temperature from the optimum value A of FIGURE 24, so that this voltage is at a minimum at very low and very high outside temperatures and is at a maximum at the temperature A. The variable thermal bias thereby applied to the bimetallic strip 209 effects the desired change in the effective set temperature of the thermostat from the actual set temperature.

Figure 26:
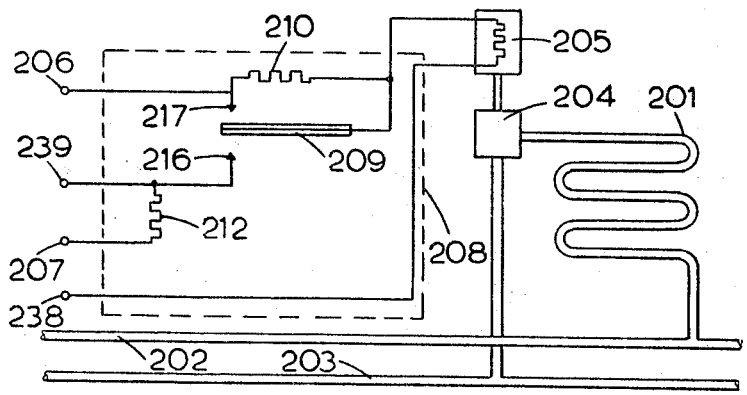
FIGURE 26 illustrates an alternative embodiment of the device of FIGURE 23.

FIGURE 25, like FIGURE 22, shows an arrangement in which the thermal motor 205 when energised closes the valve 204. FIGURE 26, like FIGURE 23, shows an arrangement in which the thermal motor when energised opens the valve 204, and FIGURE 26 shows the modification necessary to the embodiment of FIGURE 23 to produce the two effects mentioned above.

The apparatus to be described provides means for controlling the temperature of a controlled space preferably by means of a heat exchanger situated so as to influence said temperature and supplied with hot or chilled water, according as heating or cooling is required, via a master control valve, it being arranged so that changeover of the supply from hot to chilled water and simultaneous changeover of the control system from the heating to cooling may be effected in a simple manner.

Figure 27:
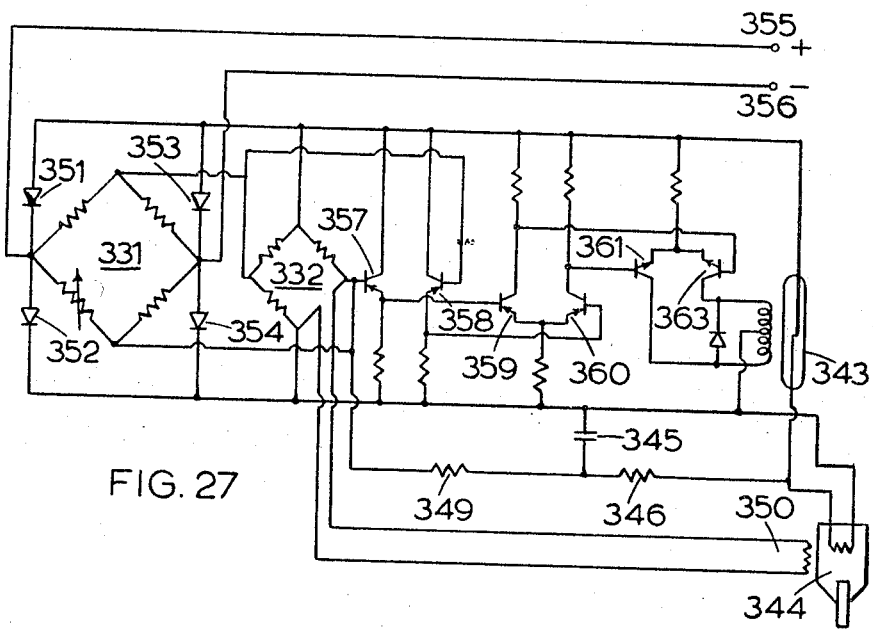
FIGURES 27 and 28 are circuit diagrams of two alternative forms of electric reversible controller.

FIGURE 27 shows an arrangement in which power is switched to a heat motor 344 actuating a control valve by a reed relay 343 the operating coil of which is energised by a D.C. amplifier. The amplifier comprises transistors 357, 358, 359, 360, 361, 362 connected in known manner and deriving an input signal from two Wheatstone Bridges 331 and 332, the output terminals of which are connected in parallel. The amplifier is provided with feedback means comprising resistors 346 and 349 and condenser 345 so connected that condenser 345 charges and discharges via resistor 346 according as the heater of heat motor 344 is energised and deenergised and a signal proportional to the condenser voltage is fed to the input of the amplifier via resistor 349. Second feedback means comprise a resistance thermometer 350 located to detect the temperature of the heat motor and electrically connected via connecting leads in one arm of the Wheatstone Bridge 332. Direct current power supply is fed via leads 355 and 356 to the input terminals of the bridge 331 and, via a bridge rectifier comprising diodes 351, 352, 353, 354, to bridge 332 and the D.C. amplifier. The operation will now be described as follows:

The Wheatstone Bridge 331 has arms of equal resistance, one of which being a resistance thermometer exposed to the temperature to be controlled, and produces at its output terminal a voltage proportional to the departure of the controlled temperature from a desired value, and of polarity dependent on the sense of said departure and also on the polarity of the voltage supply to the input terminals of the bridge.

The output of bridge 331 is connected in parallel with the output of bridge 332 and to the input terminals of the amplifier so that the signal appearing at said amplifier input is the algebraic sum of the signals produced by the two bridges together with the feedback signal derived via resistance 350 from the R.C. circuit aforementioned. When the amplifier input signal exhibits a certain predetermined magnitude and polarity the current flowing through the relay energising coil becomes sufficient to cause the reed contacts to close thereby energising the heater of the heat motor.

Now the D.C. voltage impressed upon the heater is also supplied to the resistance 346 and condenser 345 and the exponentially rising condenser voltage produces, via resistance 349, a feedback signal at the amplifier input of such sense as to reduce the original signal and eventually to cause the reed relay contacts to open. The condenser now discharges until the corresponding reduction of feedback signal is such that the reed relay contacts close again. The cycle is repeated continuously in this manner at a rate determined by the R.C. product of resistance 346 and condenser 345.

The heat motor is thus supplied with power, the average value of which is proportional to the ratio of the time that the reed contacts are closed to the total cycle time. Also, the average power is a function of the mean voltage developed across the condenser 345 and this, in turn, assumes a value approximately equal and opposite to the signal derived from bridges 331 and 332 so that the output power is approximately proportional to this latter signal. The cycle time is arranged to be small compared with the time constant of the heat motor.

The bridge 332 as aforementioned comprises an element responsive to the temperature of the heat motor and it is so arranged that the voltage produced at its output terminals is of such polarity as to cause a reduction in the power supplied to the heat motor according as the temperature of the heat motor rises. This second feedback means has the effect of considerably improving the response of the heat motor and of improving stability in the presence of supply voltage and ambient temperature variations.

It will be seen therefore that feedback signal via the first and second means described are produced according to the power supplied to the motor and the motor movement and these are such as to balance the signal from the measurement bridge 331 and hence motor movement is a function of this latter signal. The amplifier is responsive to signals of one polarity only and the above operation occurs therefore for signals from the bridge 331 of one predetermined polarity.

When the controlled space is being heated, the control valve is required to be actuated as the temperature falls below a predetermined value and conversely when the controlled space is being cooled control valve actuation is required as the temperature rises above a predetermined value. It is envisaged therefore that changeover from the heating to cooling mode is effected by a master control such that hot water or chilled water is supplied to a heat exchanger, the flow of which being influenced by the control valve, and simultaneously the polarity of the D.C. supply via leads 355 and 356 is reversed. The supply to the bridge 331 is accordingly reversed such that the signal produced at its terminals is of appropriate polarity but the polarity of supply to the amplifier via the bridge connected diodes 351, 352, 353, 354 remains unaltered.

The advantageous feature of this arrangement is that only two supply leads are required.

Figure 28:
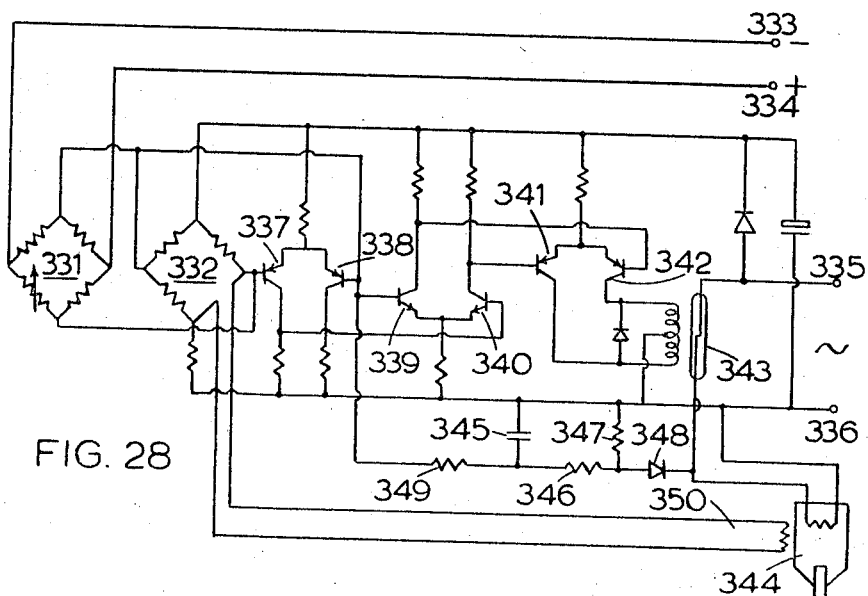

A further arrangement is shown in FIGURE 28, this being similar to that described above and comprising measuring bridge 331, feedback bridge 332, D.C. amplifier and R.C. feedback means operating in exactly the same manner but having the difference that measuring bridge 331 is separately supplied via leads 333 and 334. There are thus four supply leads to the controller but the arrangement permits greater flexibility in possible arrangements of the measuring bridge 331.

We claim:

1. An automatic temperature control system for selectively controlling the heating and cooling effect of a heating and cooling system in which a first medium is supplied to a heat exchanger which effects a heat transfer between that medium and a second medium which is to be heated or cooled, comprising: direct current power supply means comprising a change-over switch, operation of which changes the polarity of its output supply; two leads; and a controller energized by the power supply means through the two leads, the controller comprising electrically operated motor means which is connected to the heat exchanger and which changes the rate of heat transfer by changing the rate of supply of the first medium to the heat exchanger; a thermostatic device; circuit means through which operation of the thermostatic device modifies the energization of the motor means in a manner tending to correct the temperature variation which caused the operation of the thermostatic device; further means which superimpose on the control of the motor means by the thermostatic device a time-modulation effect; and polarity sensing means which change the controller from controlling the heating effect to controlling the cooling effect upon a change of polarity of the supply.

2. An automatic temperature control system as claimed in claim 1, wherein the polarity sensing means comprise rectifiers.

3. An automatic temperature control system as claimed in claim 1, wherein the thermostatic device is a bimetallic device.

4. An automatic temperature control system as claimed in claim 3, wherein the thermostatic device has only one movable component.

5. An automatic temperature control system as claimed in claim 3, wherein the controller comprises heating means for heating the bimetallic device during cooling of the second medium in a manner different from the manner in which it is heated during heating of the second medium.

6. A system as claimed in claim 1, wherein the thermostatic device is operated by a single detector.

7. A system according to claim 1, wherein the thermostatic device is included in a circuit energised by an electrical supply the polarity of which indicates whether the second medum is to be cooled or whether it is to be heated, the circuit being such that heat transfer controlling means are energised during cooling in a manner different from the manner in which they are energised during heating of the second medium.

8. A system as claimed in claim 7, wherein the electrical supply is a substantially unsmoothed fluctuating voltage from an alternating current energised rectifier system.

9. A system as claimed in claim 8, wherein the circuit energised by the unidirectional voltage includes rectifiers so poled that the desired difference in the manners of energisation of the controlling means is provided.

References Cited

UNITED STATES PATENTS

| | | | |
|---|---|---|---|
| 1,831,464 | 11/1931 | Persons | 236—68 |
| 2,006,658 | 7/1935 | Smulski | 236—68 |
| 2,075,160 | 3/1937 | Baker | 236—37 |
| 2,121,625 | 6/1938 | Crago | 236—1 |
| 2,714,142 | 7/1955 | Adlam. | |
| 2,751,152 | 6/1956 | Ellenberger | 236—1 |
| 2,816,712 | 12/1957 | Herreshoff | 236—37 |
| 3,061,197 | 10/1962 | Stodola | 236—68 |
| 3,096,935 | 7/1963 | Gibson | 236—1 |
| 3,140,852 | 7/1964 | Herzog | 237—8 X |
| 3,164,365 | 1/1965 | White et al. | |

EDWARD J. MICHAEL, *Primary Examiner.*

U.S. Cl. X.R.

236—68